Figure 1:
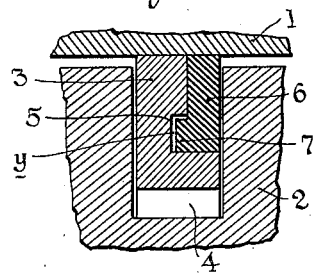

March 24, 1936. A. W. MORTON 2,035,435

PACKING RING

Filed May 23, 1935

Inventor
Allen W. Morton
By Dodge and Sons
Attorneys

Patented Mar. 24, 1936

2,035,435

UNITED STATES PATENT OFFICE 2,035,435

PACKING RING

Allen W. Morton, Baltimore, Md., assignor to The Bartlett Hayward Company, Baltimore, Md., a corporation of Maryland Application May 23, 1935, Serial No. 23,107

7 Claims. (Cl. 309—29)

REISSUED

This invention pertains to packing rings.

The main object of the invention is to provide a multi-part ring, one element whereof tends, as it bears against and is moved over the cylinder surface, to initially wear in more quickly than the other member or members of the ring assembly, and by reason of its physical characteristics, to fill up the minute voids or pockets which may be existent in the cylinder surface, and to render the latter smooth or "slick". The other component element, or elements, of the ring assembly, which are formed of a harder material, have a contact or bearing surface which is of such character as to carry the lubricant along therewith throughout its movement back and forward in the cylinder.

Another object of the invention is to produce a packing ring of two parts, one of which is made of a relatively soft material and the other of a relatively hard material, and form the composite packing ring so that the harder portion not only supports the softer portion, but restrains it in its movement toward the surface with which the ring effects a sealing relation. For instance, if the composite packing ring were made with a bronze portion and an iron portion, the iron portion would support and protect the bronze portion from excessive wear.

It has been found, in actual use, that a packing ring made of bronze throughout often wears very rapidly and sometimes flows over the edge of the groove in the piston, and even hammers itself out of shape in the groove. Hence, if a packing ring can be made half of bronze and half of iron, the bronze portion will be only half the total width and, therefore, lighter than a ring composed entirely of bronze, and less likely to pound itself out of shape.

Also, the cost saving is considerable as an all bronze ring would cost much more than a ring half bronze and half iron, and yet the composite ring will have all the advantages of the good bearing characteristics of the softer bronze without the danger of the bronze wearing away rapidly.

By reason of the fact that the surface to be sealed against the passage of fluid pressure (steam, gas or otherwise) in a sense becomes glazed, the bearing or sealing face of the harder ring element will function with the surface to be sealed to the highest degree, to prevent leakage of fluid under pressure past the same.

A further object of the invention is to provide a ring wherein the softer, or what may be termed the glazing element, which also acts as a sealing element, is restrained or limited in its movement toward the surface to be sealed by interconnection with the other ring element or elements, either directly or through the interposition of a separate restraining element, as the case may be, this with a view of precluding undue wearing away of such softer element.

A still further object of the invention is to provide means whereby the component elements which have a restrained movement with relation to each other, may be forced outwardly into contact with the cylinder surface and held to place at all times.

Another object is to utilize in conjunction with the bronze element of the ring, an iron element having special physical characteristics, to wit, one which upon examination under the microscope shows an admixture of small and large grains. Such an iron insures good wear, as well as ensuring good oil carrying properties, and hence good lubrication.

Various forms or embodiments of the invention are shown in the annexed drawing, wherein:—

Figure 3:
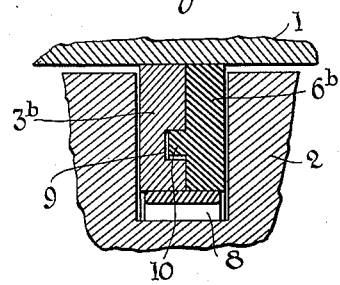
Figure 4:
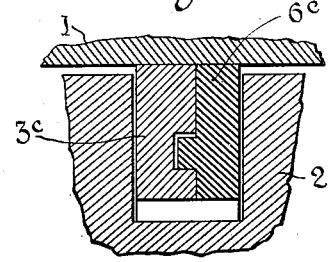
Figure 5:
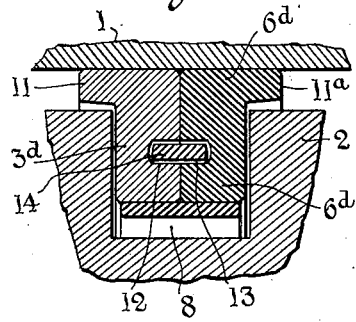
Figure 6:
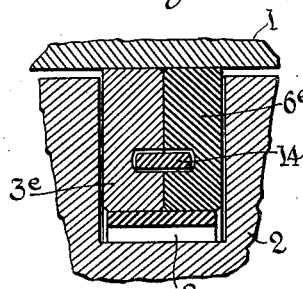
Figure 7:
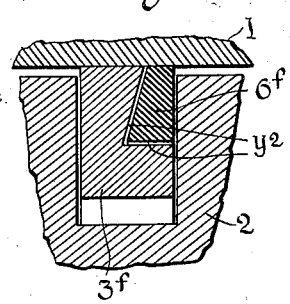
Figure 8:
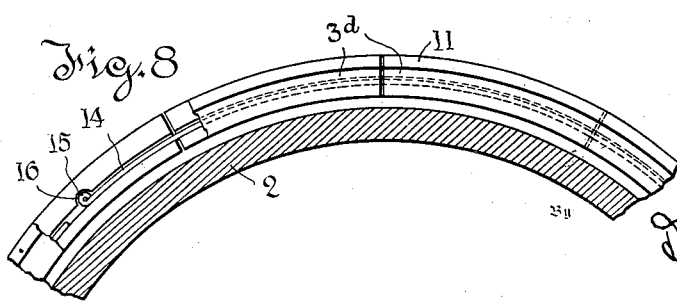

Figures 1 to 7, both inclusive, are sectional views illustrative of various embodiments of my invention, wherein a portion of a cylinder and piston are shown, and a ring is likewise illustrated as being seated within the groove formed within the piston, and appearing in cross-section; and Fig. 8 is a sectional elevation showing a portion of a piston and likewise a portion of a ring seated within the groove formed in the piston, the ring being of the form illustrated in Fig. 5.

The ring, as will be seen, takes various forms in cross-section, but in each instance, one annulus is formed of iron, while the other is produced from hard bronze, and under all constructions, the bronze element is restrained from outward movement with reference to the iron element.

Again, it is sometimes preferred to produce each member of the ring, to wit, the iron annulus and the bronze annulus, from a series of segmental sections, as best shown in Fig. 8, the joints in the two annuli being staggered in relation to each other.

Throughout the various figures, the cylinder is denoted by 1, and the piston by 2.

Referring to Fig. 1, the reference numeral 3 denotes one annulus or member produced from iron. Said member 3 at its inner portion is of a width to substantially fill the ring groove, a slight clearance being shown between said member and the adjacent walls of the ring groove 4.

The member 3 is provided upon its inner side face with an arcuate groove or channel 5, which is concentric with the outer cylinder contacting face of said member 3.

The bronze ring member or annulus is denoted by 6, and its inner portion is complemental in form to that of the member 3, thereby producing a tongue or projection 7 which extends into the groove 5, the body of the bronze element 6 extending outwardly of the ring groove and contacting the cylinder face, and likewise, contacting the adjacent face of the section 3 throughout the upper portion thereof.

A small clearance $y$ is present in the ring between the vertical and upper horizontal faces of the tongue or projection and the adjacent walls of the element 3, or more specifically, the walls of the groove or channel 5. It will thus be seen that the outer face of the bronze element 6 may bear independently against the cylinder, and as the piston is moved back and forth within the cylinder, carrying the ring over the inner surface of the cylinder and any degree of wear takes place on the composite ring, the bronze will wear away, filling any minute voids, blemishes, pockets or the like, in the cylinder surface.

By reason of the fact that there is clearance between the upper wall of the channel 5 and the upper wall of the tongue or projection 7, steam or other fluid under pressure passing into the ring groove beneath the ring may tend to force the bronze element 6 outwardly, holding it up to the cylinder wall until such time as the faces just above mentioned contact, after which the cylinder contacting surfaces of the various ring sections will maintain a fixed relationship and bear fairly and equally against the cylinder wall.

Hereafter, throughout the various figures of the drawing, the iron member or segments of the ring will be denoted by 3, with an exponent added thereto, and the bronze section by 6, also with an exponent.

Figure 2:
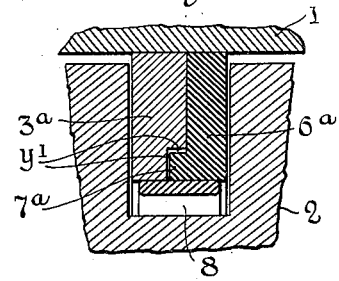

Thus in Fig. 2, the iron section or sections are denoted by $3^a$ and the bronze element or elements by $6^a$. The member $3^a$ is cut away at its inner portion while the member $6^a$ is provided or formed with a laterally projecting shouldered portion $7^a$. A clearance $y'$ is provided between each face of the shouldered portion $7^a$ and the corresponding faces upon the member $3^a$. As shown in this figure, an expander spring 8 is placed within the ring groove and bears against the various ring sections, forcing them outwardly into close sealing contact with the cylinder 1. The bronze section or sections $6^a$ will wear away more quickly than the cast iron, producing a smooth surface upon the interior of the cylinder. Its outward movement, however, will ultimately be arrested by the contacting of the shoulder $7^a$ with the upper wall of the undercut portion of the member $3^a$, and thereafter the ring segments—iron and bronze—will move outwardly together.

In Fig. 3, the iron section of segments of the ring denoted by $3^b$ are provided with a segmental or annular groove or channel 9, in that face which lies next to the bronze member $6^b$. Said latter member is provided with a tongue 10 which, when the ring is positioned within the ring groove, enters the groove 9 formed in the adjacent side wall of the member $3^b$. An expander spring as 8 bears against the innermost edges of the ring sections and forces the same outwardly. In this instance, a clearance is shown below the tongue 10 and between it and the vertical wall of the groove or channel 9, as the expander spring 8 will maintain the ring sections against the cylinder and the bronze sections would naturally wear away faster than the iron sections, and hence after the packing had worn-in, this clearance between the tongue and groove would be as shown in the drawing.

In Fig. 1, however, the clearance between the bronze and iron elements would be on the outer side of the tongue as the iron ring would in all probability support the bronze ring after the rings had been in service and fully worn-in.

In Fig. 4, the iron element of the ring is denoted by $3^c$ and the bronze member by $6^c$. The construction is similar to that shown in Fig. 3, but for the fact that the rings have inherent tension and do not require an independent spring expander and clearance between the tongue and the groove is shown above instead of below, as well as laterally of the tongue. In the construction shown in Fig. 4, the iron ring supports the bronze ring and maintains it against the cylinder and, hence, the clearance between the tongue and groove is on the outer side.

Under this construction, fluid under pressure acting beneath the ring may force the parts outwardly, and as a consequence, the member $6^c$ will wear away and glaze the surface of the cylinder until the lateral projection on such member $6^c$ contacts the upper portion or wall of the groove in the member $3^c$.

In Fig. 5, the composite ring is made of segmental sections. The iron sections are denoted by $3^d$ and each of them is provided with a laterally extending flange or projection 11, the under face whereof inclines upwardly away from the piston to admit the entrance of fluid under pressure beneath the flange. The bronze member or sections is denoted by $6^d$ and is complemental in form to the member $3^d$, and has a flange $11^a$, similar to the flange 11. In the adjacent side faces of the elements $3^d$ and $6^d$ there is produced a segmental groove 12, the grooves aligning with each other throughout the series of segments, as clearly shown in Fig. 8, and forming an annular chamber 13 in which is mounted a restraining element 14, preferably produced from a piece of flat annealed, relatively non-resilient steel and being smaller in cross-section than the measurements of the chamber in which it is mounted, this in order that the parts will not bind and that the various ring segments may have a slight relative movement with reference thereto and to each other. Preferably, as shown in Fig. 8, the end of the restraining member 14 will be curled or turned upon itself as at 15.

In assembling the segments, it is preferable to have the joints of one series break joint with those in the other, and to maintain them in such relation, hence a recess 16 will be formed in one segmental section of each series extending from the groove or channel 12, said recesses being so positioned with reference to the ends of the sections as to insure a misalignment of the joints between the segments of the two series when the segments are assembled. When in this position, the head or curled portion 15 of the restraining member 14 enters the openings and prevents relative movement of one series of segments with reference to the other. An expander spring as 8 may, or may not be present. It is shown in Fig. 5 and certain of the other figures above described.

A structure similar to that shown in Fig. 5 is shown in Fig. 6, wherein the parts are identical with the exception of the omission of the flanges 11 and 11a. The iron segments or member is denoted by 3e, the bronze member or elements by 6e, the restraining band or element by 14, and the expander spring by 8.

In Fig. 7, a still further modification is shown. In this instance, the iron element 3f is cut away upon one side adjacent the outer portion thereof to produce a recess for the reception of the bronze element 6f. As will be seen, the recess enlarges toward the inner portion of the ring and, conversely, the member 6f is wedge-shaped with an inclined face complemental to the inclined face defining one wall of the recess in the member 3f. A clearance indicated by y2 is provided between the adjacent faces of the members 3f and 6f so that the bronze member may have a relative movement with reference to the cast iron member 3f. When the ring is assembled and seated within the ring groove, the member 6f will doubtless be moved outwardly into direct contact with the cylinder wall by steam or like pressure entering the space below its under face and be held against the cylinder. In this way, it will glaze the inner face of the cylinder but will be ultimately restrained when the inclined faces of the ring sections 3f and 6f come into contact.

Under all the various constructions when composed of a series of arcuate sections, it will be noted that the bronze element of the ring is restrained from moving outwardly beyond the cylinder contacting surface of the iron segments once the bronze has worn down to a sufficient degree, by which time the surface of the cylinder will have become smooth and glazed, so to speak, by the bronze rubbed off of the bronze element and embedded in the minute pits or pockets in the cylinder surface. The iron elements carry the oil over the "slick" surface of the cylinder thus produced. It has been found in actual practice that the combination ring as above described will outlast all rings which are produced wholly from iron, even though the construction be similar to the bronze-iron combination ring in all other particulars.

Where the iron entering into the iron rings or elements is composed of a mixture of small and large grains, as viewed under the microscope, good wear obtains as well as good lubrication. Seemingly, the coarser grain material allows the small grains that break off from the surface to be pushed back into the matrix and what may be termed the rough surface, left by the coarser grain particles, apparently carries oil more readily than very close grained iron.

A combination of a close grain and open grain iron has produced the best results for wear and this may be accounted for in that the mixture of small and large grains in a ring is somewhat analogous to a good piece of concrete which is made up of hard materials grading from very large sizes down to small sizes, with the interstices filled up with a good bond of cement.

Apparently, the combination of the bronze and cast-iron affords some bonding action to the small grains of iron, by having the bronze rub over the surface and fill up the pores and, seemingly, preventing the relatively jagged surfaces of the cast-iron cylinder and ring from seizing or catching upon one another and breaking off particles, causing abrasive material to become mixed with the oil.

The ring made up as above described has been found to give superior use over either straight bronze or straight iron rings. Moreover, in the laboratory tests, it has been found that bronze does not always give consistent results and the same is true of cast-iron. When, however, iron and bronze are brought together and subjected to a wear test, invariably good results obtained, whether or not a good grade or a poor grade of iron, or a poor grade of bronze or a good grade of bronze was employed.

It may be said, however, that a harder bronze gives better results than a softer bronze, not only when used alone but when used in combination with cast-iron.

I am aware that it is not new to employ bronze and iron in combination in producing a piston ring. I am not aware, however, that it is not new to provide such a combination wherein the iron and bronze elements have a relative but restrained movement with reference to each other, which allows and causes the bronze element to produce a surface upon the inner face of the cylinder, as above described, with which the iron element or elements of the ring function to greater advantage.

What is claimed is:

1. A packing ring, comprising two annuli standing in facewise relation, one formed of iron and the other of bronze, said annuli being free to move relatively to each other in a radial direction; and means for restraining and limiting the movement of the bronze annulus with reference to the iron annulus.

2. A packing ring, comprising two annuli standing in facewise relation, one formed of iron and the other of bronze, said annuli being free to move relatively to each other in a radial direction; and interrelated means between said annuli for limiting the radial movement of the bronze annulus with reference to the iron annulus when said bronze annulus has worn away to a limited extent.

3. A packing ring, comprising two annuli, one of iron and the other of bronze, said annuli being in contact at their adjacent side faces and said annuli being movable relatively to each other in a radial direction; and means formed integral with said annuli for limiting the extent of radial movement of the bronze annulus with reference to the iron annulus.

4. In combination with a piston having at least one ring receiving groove formed therein; a ring seated in said groove, said ring comprising two annuli, one produced from bronze and the other from iron, and each annulus being formed from a series of arcuate sections standing in end to end relation, and each of said arcuate sections having an arcuate groove formed in its inner side face, the grooves in one annulus standing opposite those of the other and producing a chamber; and a non-resilient restraining member mounted in said chamber, said restraining member having a cross-section less than the cross-section area of the chamber aforesaid, whereby the sections of the ring are restrained from undue movement one with reference to the other.

5. A packing ring, comprising two annuli, one of iron and the other of bronze, said annuli standing in facewise contact, one of said annuli having an annular groove formed in its side face and the other of said annuli having a projection extending outwardly therefrom and entering said groove, there being a clearance between said groove and said projection whereby a slight relative movement between the two annuli may take place and the bronze element move outwardly into contact with the cylinder, such outward movement being limited by the groove and projection construction.

6. A packing ring, comprising two annuli, one of iron and the other of bronze, the iron annulus having a groove formed in one side face and extending circumferentially thereof, said groove being greater in depth in the axial dimension of the ring at the bottom of the groove than at the periphery of the ring; and a bronze annulus seated in said groove, said bronze annulus having an inclined face complemental to that of the groove formed in the iron annulus, there being a clearance between the two annuli whereby the bronze element may move outwardly to a limited extent independently of any outward movement of the iron annulus.

7. A packing ring comprising two annuli standing in facewise relation and fitting loosely in a ring receiving groove, said annuli being free to move relatively to each other in a radial direction, one of said annuli being formed of a material harder than the material of the other annulus, whereby the softer annulus wears in against the surface with which the packing ring may be employed to effect a seal more quickly than the relatively hard annulus and also renders the surface to be sealed smooth; and means for restraining and limiting the subsequent movement of the softer annulus with reference to the harder annulus.

ALLEN W. MORTON.